Patented Sept. 3, 1940

2,213,495

UNITED STATES PATENT OFFICE 2,213,495

TALC CONTAINING CERAMIC COMPOSITION

Donald Hagar, Zanesville, Ohio

No Drawing. Application August 10, 1939,
Serial No. 289,456

10 Claims. (Cl. 106—11)

This invention relates to ceramic compositions and, more particularly, to compositions used in the manufacture of earthenware, including such products as art ware, wall tiles, floor tiles, semi-porcelain dinnerware and related ceramic products.

In recent years, talc, a hydrous magnesium silicate, has been widely used in ceramic compositions and has resulted in greatly improved products. The advantages of the talc body compositions are that: first, they safely withstand very fast firing schedules; second, have low shrinkage; third, develop high strength at low temperatures; fourth, the products have a very low moisture expansion and when properly fitted to the glazes are highly resistant to the crazing of the ware.

During the early stages of talc body development, it was thought necessary to use at least fifty (50%) per cent. of talc or the equivalent of 15% magnesium oxide in the body compositions. It has been found that very satisfactory ceramic ware can be manufactured using talc of 5% to 45% or an approximate magnesium oxide content of from 1.5% to 13.5%.

Compositions containing from 5% to 45% talc have been found to have most of the advantages of the higher talc compositions and are not as expensive to manufacture or as difficult to produce. The chief disadvantage of these lower percentage talc compositions is the fact that their thermal expansion changes greatly with variations in the firing temperatures. The change in thermal expansion of these bodies due to firing variation can so affect the fit of the glaze as to cause higher manufacturing losses due to "shivering" or crazing of the glaze. These defects are caused by inequalities in the thermal expansion of body and glaze.

It may be said that the talc body compositions heretofore described have, because of the changes in thermal expansion, a safe firing range of not more than two cones or approximately 30° C. This narrow firing range has limited the use of talc body compositions to plants equipped with kilns that permit of close temperature control.

The object of my present invention is to increase the firing range of talc body compositions by reducing the amount of the changes in thermal expansion due to variations in the firing temperature.

I have found that the addition of small quantities of barium carbonate in the form of the commercial precipitated product or the natural mineral, Witherite, to talc body compositions, reduces the thermal expansion of the composition and, also, substantially reduces the change in thermal expansion of the composition caused by relatively wide variations in the firing temperature.

Talc body compositions without the addition of barium carbonate have a safe firing range of only two cones, or approximately 30° C., and I have discovered that this firing range can be extended as much as nine cones, or approximately 125° C., by the addition of small quantities of barium carbonate.

Before the employment of talc as a primary constituent material in the manufacture of white ceramic ware, the chief difficulty encountered was the tendency of the ware to craze, that is, cracking of the glaze. This crazing would sometimes occur shortly after the product was on the market or in use. Experience established the fact that this crazing was undoubtedly due to the tendency of the product to absorb moisture and expand, thus cracking the glaze. This action is known as moisture expansion of the body. Prior to the use of talc, all white ware bodies were usually composed of clays, ground silica and feldspar. Firing temperature was from cone 8 to cone 10, or, roughly, from 2237° F. to 2300° F.

By the use of relatively large quantities of talc or magnesium silicate, compositions were obtained which greatly reduced the moisture expansion of these white ware bodies and correspondingly reduced the tendency to craze. However, the first compositions utilizing talc employed the equivalent of 15% of magnesium oxide. In terms of comparatively pure talc, this would amount to a minimum of 45% talc. Prior practice, therefore, has employed a minimum of 45% talc in craze resisting compositions.

I have found that such compositions can be produced employing much lower percentages of talc and yet obtain very good results from the standpoint of craze resistance, as well as other desirable properties. In this connection, I employ talc in percentages varying between 1 and 40.

The white ware bodies developed in this field are quite susceptible to temperature variations and, therefore, are too sensitive for use in plants which do not have close temperature control of kiln operation. The 40% talc bodies are especially sensitive and this sensitiveness is caused by a change in the thermal expansion of the bodies over a comparatively small range in temperature. Thus, I have found that 40% or less of talc may be used satisfactorily if the kiln temperatures are maintained under close control. The general use of talc compositions, wherein the talc ranges between 1 to 40% has been considerably hampered due to the short firing range as explained above. In addition to the increased crazing resistance of these bodies, they are matured at much lower temperatures (from 1922° F. to 2174° F.), thus resulting in substantial fuel savings. Another important feature of such talc bodies is their ability to withstand rapid firing without loss.

Realizing that the further application and use of talc in limited quantities in bodies of this type would depend on more closely controlled kilns, or bodies of wider firing range, I have found that greatly improved results are obtainable by the addition to such compositions of a small amount of barium carbonate, usually less than 1%. Thus bodies containing 45% of talc combined with barium carbonate, will have a safe firing range of at least 7 cones or approximately 200° F. as compared with a safe working range of not more than 2 cones or 50° F. when barium carbonate is not used.

Therefore, in accordance with my invention, for the first time bodies containing less than 50% of talc can safely be processed through practically any type of commercial kiln now in use, avoiding the necessity of employing close temperature control.

My improved composition may possess the following analyses:

|  | Per cent |
|---|---|
| Silica ($SiO_2$) | 40 –80 |
| Alumina ($Al_2O_3$) | 2 –15 |
| Magnesia (MgO) | 1 –15 |
| Calcia (CaO) | .5 – 5 |
| Sodium oxide ($Na_2O$) | .5 – 3.0 |
| Potassium oxide ($K_2O$) | |
| Barium carbonate ($BaCO_3$) | .1 – 5 |
| reduced to | |
| Barium oxide (BaO) | .07– 3.8 |

The ingredients are mixed in the usual way and fired under customary conditions. The percentages given in this description and the following claims are by weight, unless otherwise noted.

A preferred composition which I have found satisfactory in wall tile manufacture comprises:

|  | Per cent |
|---|---|
| Ball clay | 25 |
| Flint | 30 |
| Talc | 40 |
| Feldspar | 5 |
|  | 100 |

This composition may be used with satisfactory results in the event close temperature control is obtainable. However, a much wider range of firing temperatures may be used if to the composition last given, five-tenths of one per cent. (0.5%) of barium carbonate is added thereto.

While I have specified talc as one of the essential ingredients of my improved composition, it will be understood that by this term, I not only intend to include the chemically pure product but also such talc compositions as tremolite or pyrophyllite.

What is claimed is:

1. A new ceramic composition for tiles and other light glazed articles comprising as essential elements from 5% to 45% talc, from .1% to 5% barium carbonate, the balance of the composition being composed of clay, flint and feldspar.

2. A new ceramic composition for tiles and other light glazed articles comprising as essential ingredients from 5% to 45% talc, from .1% to 5% of a thermal expansion stabilizer in the form of a barium compound, the remainder of the composition being composed of clay, flint and feldspar.

3. A new ceramic composition for tiles and other light glazed articles comprising as essential ingredients from 5% to 45% talc, from .1% to 5% of a barium compound, the latter acting as a thermal expansion stabilizer.

4. A new ceramic composition for tiles and other light glazed articles comprising silica 40% to 80%, alumina 2% to 15%, magnesia 1% to 15%, calcia .5% to 5%, sodium oxide .5% to 3%, barium carbonate .1% to 5% reduced to barium oxide .07% to 3.8%.

5. A new ceramic composition for tiles and other light glazed articles comprising silica 40% to 80%, alumina 2% to 15%, magnesia 1% to 15%, calcia .5% to 5%, potassium oxide .5% to 3%, barium carbonate .1% to 5% reduced to barium oxide .07% to 3.8%.

6. A new ceramic composition for tiles and other light glazed articles comprising ball clay 25%, flint 30%, talc 40%, feldspar 5%, barium carbonate .5%.

7. A new ceramic composition for tiles and other light glazed articles comprising as essential elements from 5% to 45% talc, from .1% to 5% barium carbonate, the balance of the composition being composed of clay, flint, feldspar and pyrophyllite.

8. A new ceramic composition for tiles and other light glazed articles comprising as essential ingredients from 5% to 45% talc, from .1% to 5% of a thermal expansion stabilizer in the form of a barium compound, the remainder of the composition being composed of clay, flint, feldspar and pyrophyllite.

9. A new ceramic composition for tiles and other light glazed articles comprising silica 40% to 80%, alumina 2% to 15%, magnesia 1% to 15%, calcia .5% to 5%, sodium oxide .5% to 3%, barium oxide .07% to 3.8%.

10. A new ceramic composition for tiles and other light glazed articles comprising silica 40% to 80%, alumina 2% to 15%, magnesia 1% to 15%, calcia .5% to 5%, potassium oxide .5% to 3%, barium oxide .07% to 3.8%.

DONALD HAGAR.